Nov. 10, 1959    N. B. WALES    2,912,648
RAPID TESTING DEVICE FOR MULTICONDUCTOR ELECTRIC CABLES
Filed Dec. 22, 1958    3 Sheets-Sheet 1

INVENTOR
Nathaniel B. Wales

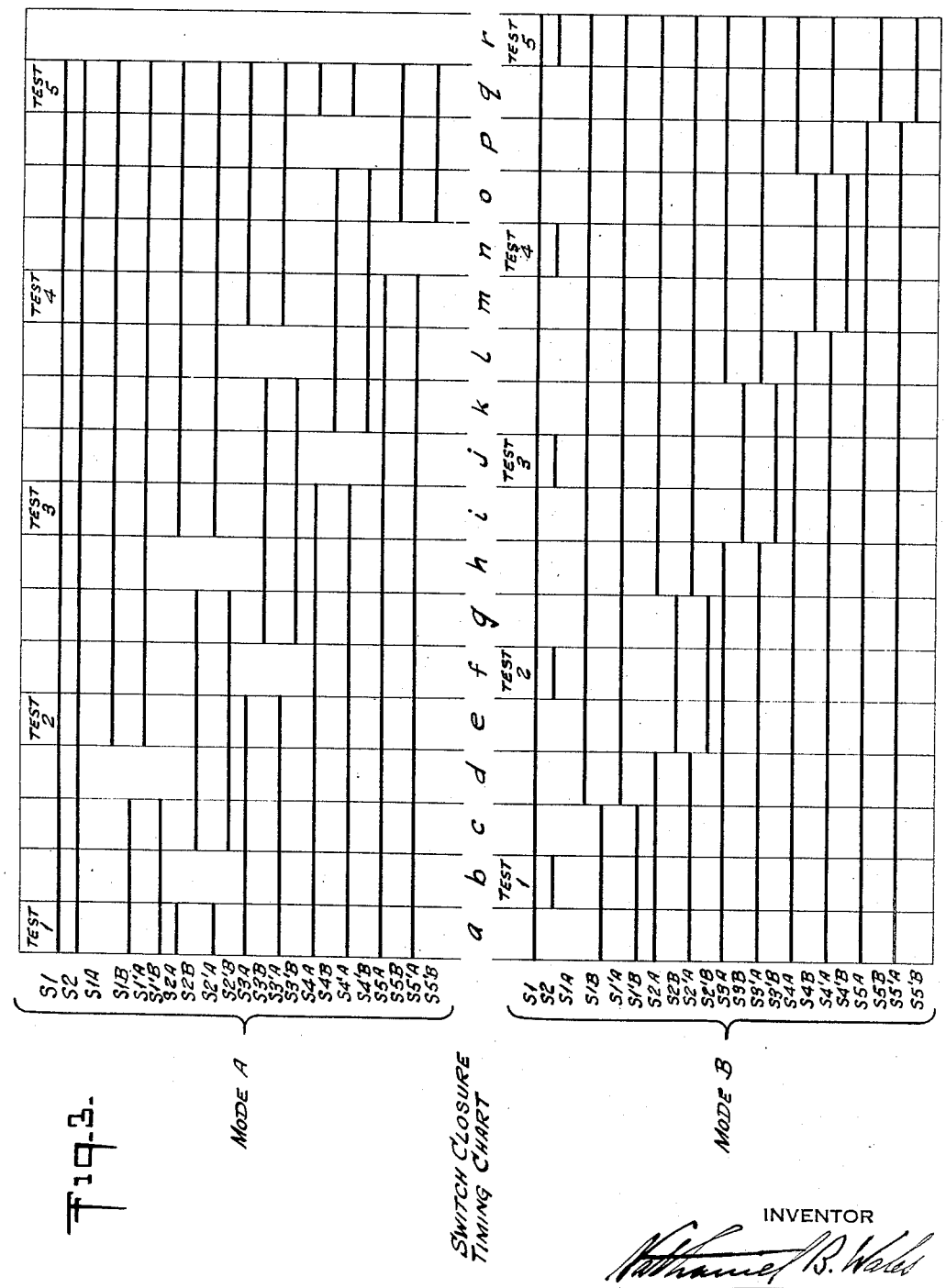

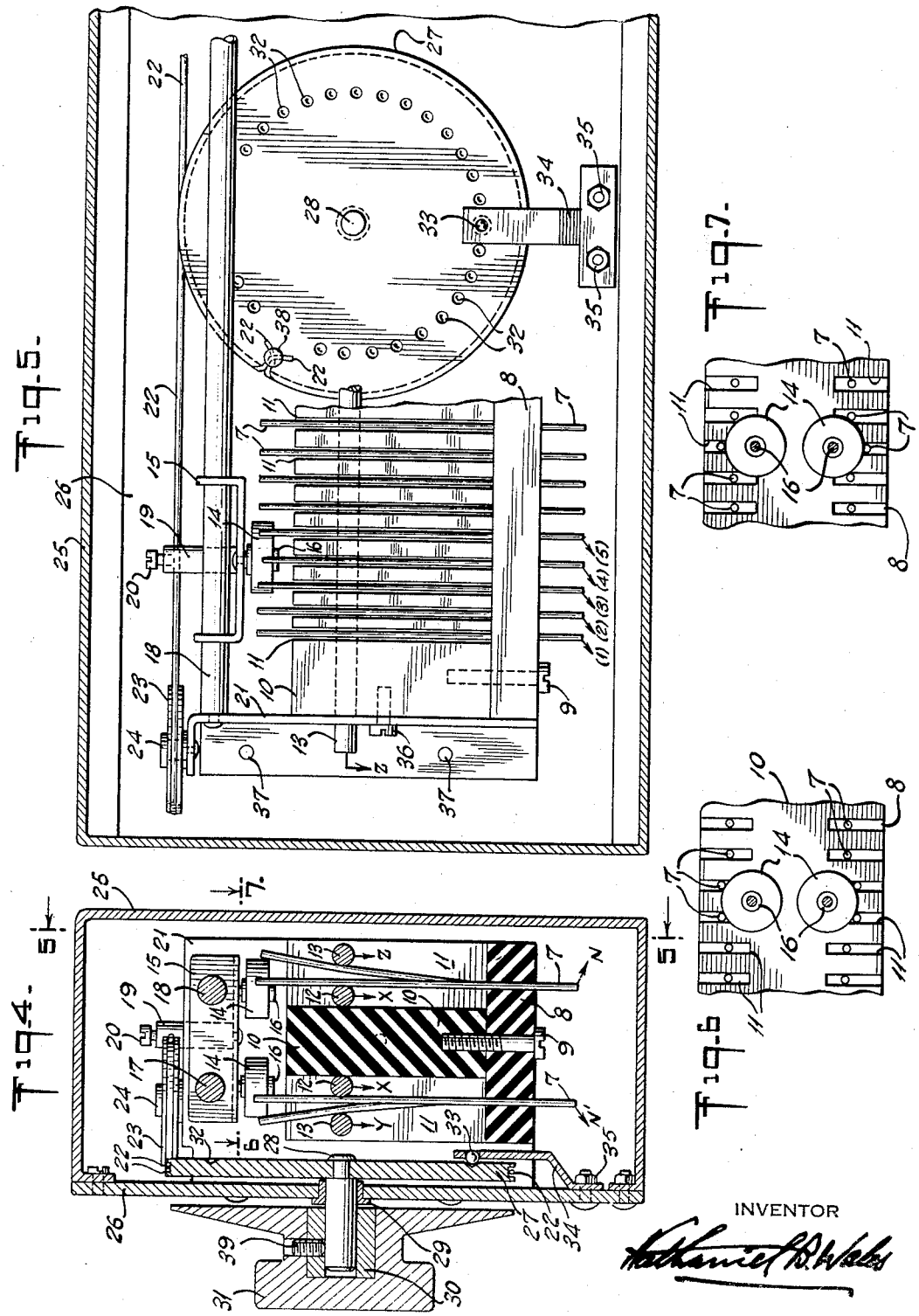

United States Patent Office 2,912,648
Patented Nov. 10, 1959

2,912,648

RAPID TESTING DEVICE FOR MULTI-CONDUCTOR ELECTRIC CABLES

Nathaniel B. Wales, Southampton, N.Y.

Application December 22, 1958, Serial No. 782,032

5 Claims. (Cl. 324—73)

This invention relates to an apparatus for rapidly testing the electrical integrity of each conductor of a multiconductor cable, seratim, in such a way that the electrical continuity, resistance, and leakage resistance relative to every other conductor in the cable, is measured simultaneously for each conductor in turn, and, if any one of the conductors fails to meet predetermined requirements for these three measured values, a memory register is caused to be instantly actuated.

In this way, my invention permits a rapid scan of all the cable conductors for the presence of a fault without regard to the location of such a fault. If a fault is indicated by this rapid scan, my invention provides for the resetting of the fault register, and the subsequent scan at a step-by-step rate until the fault or faults are individually located and identified as to type of fault by auxiliary indicator.

The utility of this device beyond the existing art lies in its compact portable form, and in its ability to expedite the rapid selection of a faultless cable in application such as military weapons systems where it is important to interconnect equipments in a minimum of time.

The principle of this invention depends on the combination of, first, a switch having a plurality of poles each connected to the end of a cable conductor and provided with means to electrically short together all said poles except a selected pair corresponding to the ends of one cable conductor, and second, a voltage divider circuit communicating with said switch and having the property of producing a single output potential capable of tripping a memory register in response to any predetermined deviation in either the continuity, resistance, or leakage resistance relative to all other conductors in the cable, of the currently said selected conductor.

A feature of my invention is the construction of the foregoing switch and associated circuitry in such a way as to prevent the spurious actuation of the fault register for opens or shorts during the transition from the serial interrogation of one cable conductor to that of the adjacent conductor.

An object of this invention is to provide a rapid and portable means for testing multiconductor cables.

A second object is to provide means in a multiple conductor cable tester for registering on a single indicator the transient signal corresponding to any of several types of faults as the conductors are rapidly tested in sequence.

A third object is to provide a simple and sturdy switch structure which can serially electrically separate one pair of poles at a time from a condition of mutual shorting interconnection between an even plurality of such poles, and can give individual electrical access to the given pair without at any time either interconnecting either access lead to the shorted remainder, or opening the access leads from simultaneous communication to at least one pair of poles.

A fourth object is to provide a multiconductor cable testing circuit which will simultaneously test a conductor for continuity, resistance, and leakage resistance relative to any other conductor in the cable.

Other objects are implicit in these specifications, drawings, and claims.

In the drawings:

Fig. 3 is a switch closure timing chart for the circuit of Fig. 2 showing two modes of operation for the tester;

Fig. 4 is a central section in elevation of the preferred embodiment of the switch structure taught by my invention;

Fig. 5 is a partial section through 5—5 of Fig. 4;

Fig. 6 is a view through 6—7 of Fig. 4 showing the transitional position of the switch; and Fig. 7 is a view through 6—7 of Fig. 4 showing the test position of the switch.

Figure 1:
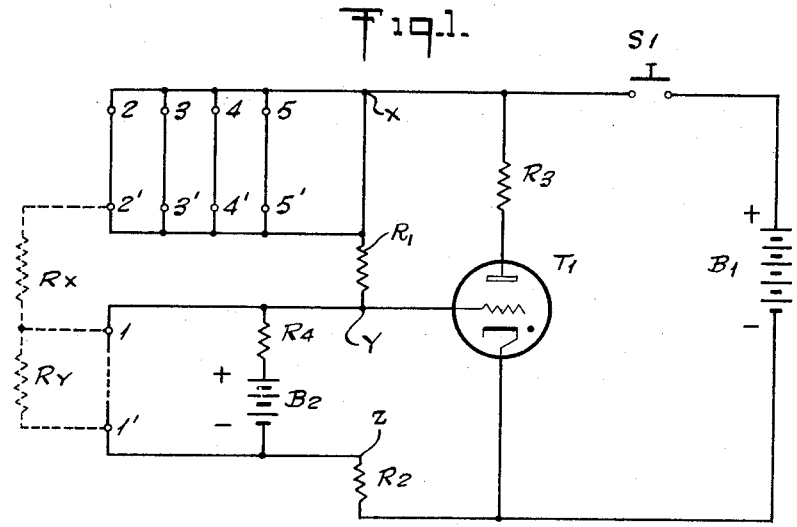
Fig. 1 is the schematic wiring diagram of a simplified form of my invention illustrating its principle of operation at a given switch position.

Referring to Fig. 1, the characters 1 and 1' designate the terminal ends of one conductor of a multiple conductor cable. Similarly 2—2', 3—3', 4—4', and 5—5' designate the remaining conductors of this illustrative cable. By switching means which are omitted in this figure for clarity, the ends of conductor 1—1' are connected to points Y and Z of the circuit, while the ends of conductors 2—2', 3—3', 4—4' and 5—5' are all electrically shorted together and connected to point X of the circuit.

If conductor 1—1', which is shown under test, offers low resistance between its ends, and if there exist only very high resistance leakage paths between conductor 1—1' and any other conductor of the cable, then points Y and Z will be substantially at the same potential, and the resistors $R_1$ and $R_2$ will comprise a voltage divider or bleeder which will determine the potential of the grid of the cold cathode gas triode $T_1$ with reference to the cathode of gas triode $T_1$ when switch $S_1$ is closed. The gas memory triode $T_1$ is provided with a protective load resistor $R_3$, and the resistors $R_1$ and $R_2$ are selected so that the grid is held, under the above conditions, at a potential just below the firing potential of tube $T_1$ for the applied plate voltage of battery $B_1$.

If the cable is faulty with respect to leakage, however, there will exist an equivalent leakage resistance $R_x$ in parallel with $R_1$ which will raise the potential of the grid connection Y with respect to the cathode of tube $T_1$ thereby firing it and signalling that a faulty condition exists.

If the cable is faulty with respect to the continuity of the conductor under test, the terminals 1—1' will offer a resistance or open circuit resistance $R_y$ instead of a "dead short." Since this resistance $R_y$ is in series with points Y and Z of the grid voltage divider $R_1$—$R_2$ this condition will also raise the potential of point Y with respect to the cathode of tube $T_1$ thereby firing it and likewise signalling that a faulty condition exists.

If the cable continuity is faulty by reason of a transpositional error the indication will, of course, be the same as a leakage fault.

It may be seen that if it is desired to fire the memory indicator tube $T_1$ in response to relatively high leakage resistance $R_x$, it follows that the resistors $R_1$ and $R_2$ must be of the same order of magnitude as $R_x$ in order to raise the grid potential by a reliable amount. This requirement, however, also requires that the continuity fault resistance $R_y$ be an appreciable fraction of $R_2$ before it will fire tube $T_1$ to indicate this fault. This degree of continuity indication is in many cases acceptable. However, if it is desired to measure simultaneously both high resistance leakage and low resistance continuity, the current source $B_2$ and protective load resistor $R_4$ may be added in series between points Y and Z of the voltage divider $R_1$—$R_2$. In this case even a small increase of the continuity resistance $R_Y$ above the specified value will produce a substantial increase of the potential of grid connection Y with respect to the cathode of tube $T_1$ due to the heavy current in the local circuit loop 1—1'—$B_2$—$R_4$—1, thereby providing a firing signal for both high $R_x$ and low $R_y$.

Figure 2:
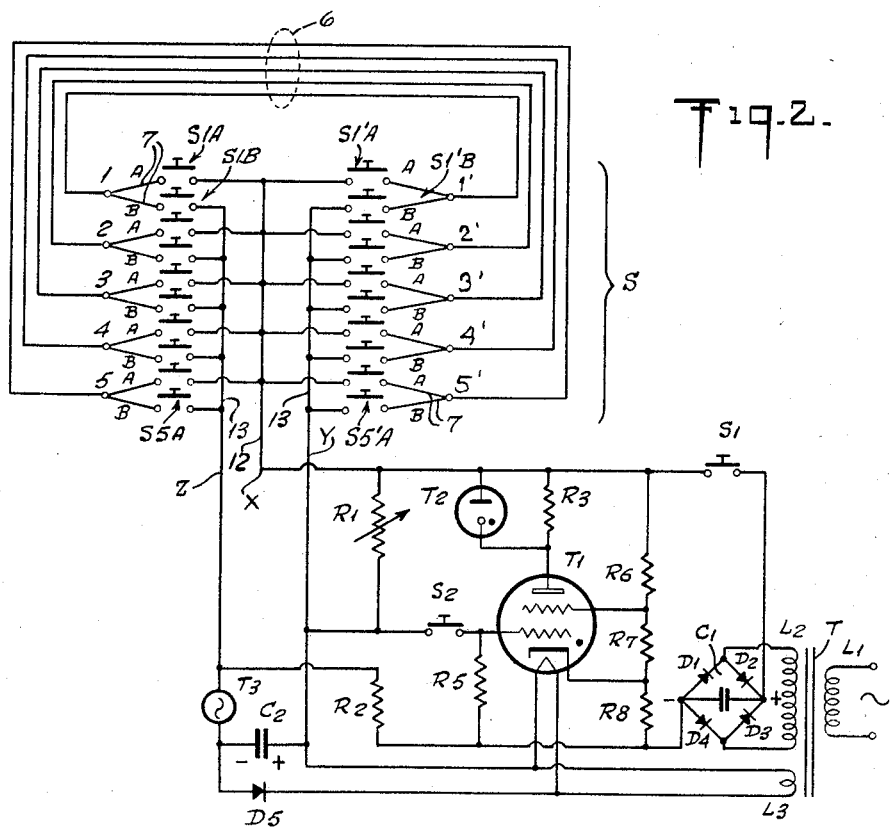
Fig. 2 is the schematic diagram of the preferred form of my invention.

Referring now to Fig. 2 it may be seen that the simultaneous testing principles of Fig. 1 have been incorporated in a practical circuit including switching means S for testing each wire of the cable rapidly in sequence, and a hot cathode thyratron $T_1$.

The switch S consists of a pole AB connected to each of the terminal ends of cable 6. Consequently, there are twice as many poles as conductors in the cable. In Fig. 2 each pole AB is shown bifurcated into two single pole single throw normally open switches such as S1A and S1B or S1'A and S1'B, so that the timing of the electrical switching transfers may be clearly described. However, the physical switch corresponding to S1A+S1B, for instance, may be a single pole double throw switch.

It may be seen that each cable conductor end can communicate through its associated pole AB to point X and either point Y or Z. These circuit points X, Y and Z of Fig. 2 correspond to those of Fig. 1, as do resistors $R_1$, $R_2$, and $R_3$.

In Fig. 2 the A.C. line power input is applied to the primary winding of transformer T thereby supplying voltage to the secondary winding $L_2$ whose output is rectified by the full wave bridge-connected diodes $D_1$, $D_2$, $D_3$, and $D_4$, smoothed by capacitor $C_1$, and supplied, via switch $S_1$, to the bleeder $R_6$—$R_7$—$R_8$ and the associated tube circuits. Transformer winding $L_3$ supplies both filament current to gas memory tube $T_1$ and also continuity testing current between points Y and Z (equivalent to the battery $B_2$ of Fig. 1). An indicator incandescent lamp signal $T_3$ is supplied in series with the testing current to isolate the type of fault indicated by the firing of memory tube $T_1$. Although not necessary, it is desirable to rectify the alternating current from secondary $L_3$ by means of diode $D_5$ and capacitor $C_2$. A gas diode indicating tube $T_2$ is supplied across load resistor $R_3$ to indicate when tube $T_1$ has fired due either to a continuity fault, a resistance fault, or to a leakage fault. Resistor $R_5$ is a very high value of resistance relative to $R_x$ or $R_2$, and is provided to prevent tube $T_1$ from firing by maintaining a negative bias on the grid when switch $S_2$ is opened. Due to the high value of $R_5$ it does not appreciably influence the dominance of voltage divider $R_1$—$R_2$ and its modifying resistance $R_x$ and $R_y$ when switch $S_2$ is closed.

The purpose of bleeder $R_6$—$R_7$—$R_8$ is to supply negative bias to the grid of $T_1$ relative to its cathode and to supply a potential to the screen of $T_1$ intermediate between its plate and cathode.

The operation of the circuit of Fig. 2 may be followed with reference to the switch closure chart of Fig. 3 in which mode A is the sequence provided by the preferred switch embodiment shown subsequently in Figs. 4, 5, 6, and 7, while mode B is an alternative sequence permitting the use of conventional snap switches.

Referring to mode A it may be seen that the testing is carried out with switches $S_1$ and $S_2$ continuously closed. In switch position $a$, both ends of conductors 2, 3, 4, and 5 of cable 6 are all shorted together to point $x$ of the circuit while the ends of conductor 1 are connected between points Y and Z of the circuit. This is the condition of Fig. 1. At switch position B, both ends of conductor 2 are disconnected from common point X while at switch step C the ends 2—2' of conductor 2 are connected in parallel with 1—1' across points Y and Z. In switch position $d$, the ends 1—1' are disconnected from points Y and Z leaving 2—2' alone on these points. Finally, in step C the switch completes one testing transfer by connecting 1—1' to rejoin the common shorting point X thereby setting up the correct test connections for conductor 2 of cable 6. The logical steps of the remaining switch positions L through $q$ are repetitious of the foregoing steps for each conductor in sequence.

It is to be noted that the above overlapping transfer of one conductor after another is intended to prevent even a momentary opening of the connection between circuit points Y and Z, or to prevent a momentary shorting between points X and Y or Z thereby guaranteeing that the firing of tube $T_1$ will be due to a fault and not to the switching sequence.

The testing steps thus comprise plugging in of the cable to the circuit of Fig. 2, the momentary opening of switch $S_1$ to extinguish tube $T_1$, the rapid operation of switch S for steps $a$ through $q$ (Fig. 3), and the observation of signal $T_2$. The lighting of $T_2$ indicates a fault of either continuity or resistance or leakage. If it is desired to localize the fault, the system can be restored to switch position $a$, switch $S_1$ momentarily opened, and the testing repeated, but in discontinuous steps so that the first switch position at switch $T_2$ lights can be observed. At this first fault position, the lighting of bulb $T_3$ indicates that the fault was a continuity fault of resistance.

The operation of my invention in accordance with mode B of Fig. 3 permits the switches such as (S1A—S1B) to be single pole double throw snap switches. This is possible without the danger of giving a spurious fault signal during switch transfer by means of the addition of switch $S_2$ which effectively disconnects the signal input to the memory device ($T_1$) except when the switches are in the desired testing configuration. Switch $S_2$ may thus be considered to be a "clock" signal. The switch steps shown in mode B of Fig. 3 also provide for overlapping transfer of the cable conductors to and from test points Y and Z of the generic circuit of Fig. 1.

Referring to the preferred switch structure of my invention shown in Figs. 4, 5, 6, and 7 for effecting the switching sequence of mode A in Fig. 3, a plurality of cantilever switch leaves 7 are secured such as by moulding to insulating block 8 so that their upper free length is free to bend about their point of emergence from block 8, and their lower protruberance from block 8 is available for connection to the switching circuit. Leaves 7 are preferably formed from Phosphor bronze wire which has been clad with a contact metal such as silver by a drawing process. Each contact pole 7 is constrained to planar motion by the slots 11 in insulating guide block 10 which is secured to base block 10 by screws 9. A pair of silver clad inner contact bars 12 pass longitudinally through the webs between slots 11 in guide block 10 in such a position that the contact poles 7 normally press against them with a prestressed elastic force. Bars 12 are externally connected together electrically and comprise the common shorting point $x$ of the circuits of Figs. 1 and 2.

A pair of outer silver clad contact bars 13 are also mounted in block 10 and pass parallel to the common shorting bars 12 so as to be normally out of contact with the switch poles 7. The subassembly of members 7, 8, 9, 10, 12 and 13 is mounted in fixed relation to switch panel 26 by means of bracket 21 at each end and by the mounting screws 36 and 37. Clearance holes in brackets 21 allow bars 12 and 13 to emerge from the ends for electrical connection without shorting to the frame. It is understood that the mechanism of Fig. 5 is symmetrical about the center line 4—4' when the switch is in mid position.

A switch actuating carriage 15 is slideably mounted on the two guide rails 17 and 18 which are in turn secured to the stationary end brackets 21. Sliding carriage 15 is provided with two actuating rollers 14 made of insulating material and secured to carriage 15 by the journal studs 16. The position of rollers 14 and guide rails 17, 18 is such that the upper ends of switch poles 7 are cammed outward in pairs as the carriage 15 is moved along its linear track so that each pair of poles 7 moves out of prestressed contact with the inner contact bars 12, through an interval of no contact, and finally into positive stressed contact with the outer bars 13. The two outer bars 13 correspond to points Y and Z of Figs. 1 and 2. The radius of the cam rollers 14 and the geometry of the constrained path of the cantilever poles 7 is chosen so that at the mid point of the transition from one switch position to the next adjacent position, as shown in Fig. 6, the two adjacent pairs of switch poles are both in positive contact with the outer bars 13, whereas at an integral switch position, as shown in Fig. 7, only one pair switch poles 7 is in contact with the outer contact bars 13. This is made possible by the location of the insulating cam rollers 14 at a plane sufficiently remote from the plane of contact between poles 7 and outer bars 13 so that the cantilever bending of the outer free portion of poles 7 can accommodate pressured contact with bars 13 in both of the degree of cam displacement of poles 7 by rollers 14 shown in Fig. 6 and also that shown in Fig. 7.

Under these circumstances the sequence of switch closure of the foregoing switch will exactly accomplish the timing shown in Fig. 3, mode A, as the carriage 15 is moved along its track.

Carriage 15 is provided with an anchor post 19 rivetted thereto and secured to flexible drive cable 22 by means of set screw 20. Cable 22 in turn passes around an idler pulley 23 at each end thence passing around and terminating in securance to drive pulley 27 by means of screw 38 which clamps both ends of the cable 22. Idler pulleys 23 are journalled to brackets 21 by means of studs 24. Drive pulley 27 is rivetted to shaft 28 which is journalled in switch panel 26 by bushing 29. A control knob 31 having insert hub 30 is secured to shaft 28 exterior to panel 26 and the attached cover case 25. The motion of switching carriage 15 under manual control of knob 31 is detented by the action of ball 33 in the detenting depressions 32 provided around the periphery of pulley 27 at positions corresponding to integral switch stations such as shown in Fig. 7. Ball 33 is constrained and spring biassed into detents 32 by the cantilever action of spring leaf 34 secured to panel 26 by screws 35.

It is within the scope of my invention to make equivalent substitutions or modifications familiar to those skilled in the art. For instance, a controlled rectifier type of semiconductor transistor may be substituted for the gas memory tubes shown in the disclosure.

I claim:

1. In a testing device for multiconductor electric cables the combination comprising a switch having a plurality of poles each connected to one end of a conductor in said cable, means to electrically connect together to a common electrical point all said poles except a selected pair of said poles corresponding to the two ends of one of said cable conductors, a first impedance connected between said common point and the first pole of said selected pair of poles, a second impedance one end of which is connected to the second pole of said selected pair of poles, means for applying a voltage between said common point and the remaining end of said second impedance, and means responsive to the ratio of the voltages appearing across each of said impedances for registering a departure from a predetermined value of said ratio whereby to detect an electrical fault in said cable.

2. In a testing device according to claim 1 means for applying a second voltage between the said selected pair of poles.

3. In a testing device according to claim 1 means for disabling said registering means while a change is being effected in the selection of a pair of said poles.

4. In a testing device according to claim 1, switch means for bridging the connection between said first impedance and said second impedance during a change in the selection of a pair of said poles.

5. In a testing device according to claim 1 means for indicating the magnitude of current flowing between said selected pair of poles.

References Cited in the file of this patent

UNITED STATES PATENTS

| | | |
|---|---|---|
| 1,977,703 | Swartwout | Oct. 23, 1934 |
| 2,582,499 | Messerschmidt | Jan. 15, 1952 |
| 2,830,264 | Wittmann | Apr. 8, 1958 |